Nov. 17, 1959 M. B. FINKELSTEIN 2,913,625

TRANSISTOR DEFLECTION SYSTEM FOR TELEVISION RECEIVERS

Filed Feb. 10, 1958

INVENTOR.
MORRIS B. FINKELSTEIN
BY
[signature]
ATTORNEY

United States Patent Office 2,913,625

Patented Nov. 17, 1959

2,913,625

TRANSISTOR DEFLECTION SYSTEM FOR TELEVISION RECEIVERS

Morris B. Finkelstein, Collingswood, N.J., assignor to Radio Corporation of America, a corporation of Delaware Application February 10, 1958, Serial No. 714,196

9 Claims. (Cl. 315—27)

This invention relates in general to deflection circuits for television receivers and the like and in particular to deflection circuits employing transistors as active circuit elements.

Most known television deflection systems include a synchronized source of deflection signals and signal amplifying means for supplying current to a kinescope deflection coil sufficient to provide complete scanning of the kinescope. In addition, circuit elements are usually included to shape the deflection signal to correct for nonlinearities inherent in the deflection circuit or its components.

A convenient way of generating a sawtooth deflection voltage is to periodically charge a capacitor through a resistor and then to rapidly discharge the capacitor. This may be achieved by using a transistor as a low impedance discharge path, for example. Since transistors require a current driving source, signal distortion may result if the generated sawtooth voltage is used to directly drive a transistor power amplifier. If this sawtooth voltage is applied to an amplifier connected to provide differential amplification, a suitable output current may be obtained for directly driving a transistor power amplifier. In addition, such an amplifier may be adapted to operate as a waveform comparison stage, and thereby to provide, in addition, a system for automatically controlling the linearity of the deflection current applied to the deflection coils.

It is, accordingly, an object of the present invention to provide an improved and novel transistor deflection circuit for television receivers and the like which provides automatic linearity control of the current supplied to the deflection coils.

It is another object of the present invention to provide an improved television deflection circuit utilizing opposite conductivity transistor amplifier stages and direct coupling therebetween.

In accordance with one feature of the invention, a transistor amplifier is connected to provide differential amplification for the purpose of providing a driving signal to an output stage and at the same time to provide automatic linearity control. This is achieved by applying to the transistor amplifier both a driving sawtooth voltage from a deflection signal generator and a voltage proportional to the current in the deflection coils. Linearity control is achieved when the D.C. level of this voltage representing the deflection coil current and the driving sawtooth voltage are adjusted to be of the same polarity throughout the deflection cycle.

In accordance with another feature of the invention, three direct coupled transistor amplifier stages alternating in conductivity type, are arranged to provide sawtooth generation, automatic linearity control, and output current for driving a deflection yoke for television kinescopes and the like. Oscillation is provided by feeding back a signal from the deflection yoke to the sawtooth generator stage to cause regeneration.

The novel features that are considered characteristic of this invention, are set forth with particularity in the appended claims. The invention itself, however, both as to its organization and method of operation, as well as additional objects and advantages thereof, will best be understood from the following description when read in connection with the accompanying drawings, in which:

Figure 1:
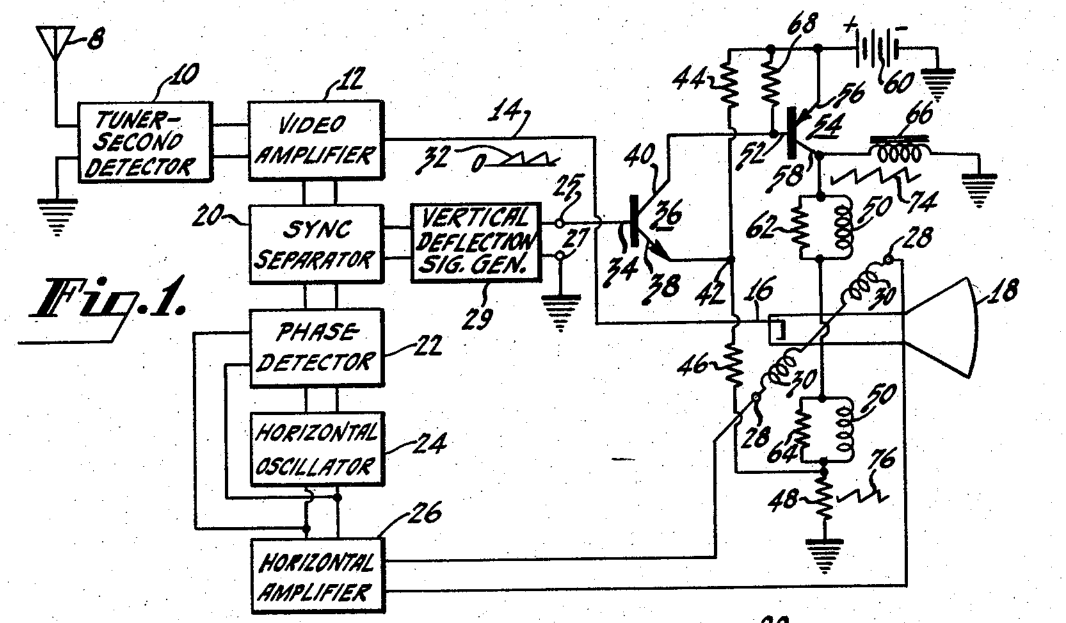
Figure 1 is a schematic circuit diagram, partially in block diagram form of a television receiver embodying the invention.

Referring now to the drawings wherein like parts are indicated by like numerals throughout the figures and referring in particular to Figure 1, a television receiver includes an antenna 8 which receives composite television signals and couples the received signals to a tuner-second detector 10. The tuner-second detector 10 is herein defined to include, as is conventional, a radio frequency amplifier, a converter for converting the radio frequency signals to intermediate-frequency signals, an intermediate frequency amplifier, and a detector for separating the video signals from the intermediate-frequency signals. The video signal is applied to a video amplifier 12 and the signal derived from the video amplifier 12 is applied by means including a conductor 14 to an electrode such as a cathode 16 of a kinescopue 18.

The video signals are also applied to a sync separator circuit 20 which is connected with the video amplifier 12. The sync separator circuit 20 supplies horizontal sync pulses to a phase detector 22, which also is supplied with the signal generated by a horizontal oscillator 24. The error voltage developed in the phase detector 22 is applied to the horizontal oscillator 24 to synchronize it with the horizontal sync pulses. The horizontal oscillator signal generated by the horizontal oscillator 24 is amplified by a horizontal amplifier 26 and the output is applied to a pair of terminals 28 of a horizontal deflection winding 30 which is suitably placed around the neck of the television kinescope 18.

Vertical synchronizing pulses from the sync separator 20 are applied to the input of a vertical deflection signal generator 29, which is operative to generate a vertical deflection sawtooth voltage 32. The output terminals 25 and 27 of the vertical deflection signal generator 29 are connected respectively to the base 34 of a driver transistor 36 and to ground. The transistor 36 which may be considered to be of the NPN junction type, also includes an emitter 38 and a collector 40. This transistor functions, in accordance with the invention, as a driver amplifier and provides differential amplification in order to automatically correct for differences between the waveform of the deflection yoke current and the driving voltage waveform as will be discussed hereinafter.

In accordance with this feature of the invention, the emitter 38 of the transistor 36 is connected to a junction point 42 of a voltage divider comprising three resistors 44, 46 and 48 which are connected in series with a direct current supply source such as a battery 60. One terminal of the resistor 48 is connected to ground and one terminal of the resistor 44 is connected to a positive terminal of a battery 60. The resistor 46 is connected between the remaining terminals of the resistors 44 and 48. It is, therefore, seen that these three resistors comprise a voltage divider which determines the magnitude of the positive voltage applied to the emitter 38 of the transistor 36. In addition, the resistor 48 is in series with the vertical deflection coil 50. Thus, the deflection current flowing through the vertical yoke coil 50 also flows through the resistor 48. For this reason, the resistor 48 should be kept low in value to minimize power losses. A replica of the deflection current flowing in the yoke coil 50 will appear as a voltage across the resistor 48, and this voltage will contain any irregularities or departures of the deflection current waveform from the driver waveform. This voltage is applied to the emitter 38 of the transistor 36, through the connection of the resistor 46 between the emitter 38 and the ungrounded end of the resistor 48.

The collector electrode 40 of the transistor 36 is directly connected to the base electrode 52 of a power output transistor 54. The transistor 54 is illustrated as being of the PNP junction type, and has an emitter 56 and a collector 58 in addition to the base 52. It is to be noted that the transistors 36 and 54 are of opposite conductivity types. That is, the transistor 36 is an NPN type and the transistor 54 is a PNP type. The conductivity of these transistors may be reversed if the polarity of the driving signal 32 and the polarity of the battery 60 are also reversed. The use of opposite conductivity transistors allows simple direct coupling between the transistors and eliminates the use of coupling capacitors which are both costly and contribute to non-linearities in the deflection waveform due to their frequency dependent characteristics.

Operating bias potential for the transistor 54 is obtained by connecting the emitter 56 directly to the positive terminal of the battery 60. The collector 58 of the transistor 54 is directly connected to one terminal of the vertical deflection coil 50 for the television kinescope 18 to provide deflection current thereto. The other end of the deflection coil 50 is connected to ground through the resistor 48.

In addition, an inductor 66 has one terminal connected to the collector 58 of transistor 54 and the other terminal connected to ground. The inductor 66 is included to prevent decentering of the raster on the kinescope 18 due to direct current flowing in the deflection coil 50. The resistance and inductance of the reactor 66 relative to the resistance and inductance of the deflection coil 50 are selected so that the direct current through the deflection coils is a minimum, yet proper deflection current is still supplied to the deflection coils. Although this reactor will shunt most of the direct collector current from the deflection coil, a small residual direct current may still flow in this coil. Some decentering of the raster may therefore occur, but can be corrected by applying compensating magnets to the yoke.

To provide a D.C. return path for the base 52 of the output transistor 54, a resistor 68 is connected between the base 52 and the emitter 56. To complete the circuit description, the individual windings of the vertical deflection coils 50 are shunted by resistors 62 and 64 in order to reduce horizontal waveform interference, and to provide damping for the vertical deflection winding.

The sawtooth driving signal 32, which is obtained from the vertical deflection signal generator 24 and applied to the base 34 of the transistor 36, is of a unidirectional nature. The term "unidirectional" is herein defined to mean that the signal 32 is of one polarity throughout the deflection cycle, and is shown in Figure 1 to be of positive polarity. At no time does the sawtooth voltage extend below the zero or ground axis and into the negative voltage region. Such a sawtooth signal may be conveniently generated by the well known method of charging a capacitor through a resistor and then suddenly short circuiting the capacitor by a low impedance path. Circuit means for obtaining this type of operation will be illustrated subsequently.

For stability reasons, it is preferable to directly couple the driving signal to the base 34 of the transistor 36, thereby maintaining this unidirectional characteristic. Capacity coupling could be used between the vertical deflection signal generator and the driver transistor 36. This type of coupling, however, would require a base return resistor for the transistor 36 in addition to the coupling capacitor. If a large base resistor were used, it would decrease the temperature stability of the transistor, while a small resistor would reduce the amplifier sensitivity. In addition, the periodic return of waveform 32 essentially to ground potential provides a clamping action on the base 34 of transistor 36 which enhances stability of operation.

In operation, the driving signal 32 is amplified and phase inverted and appears at the collector 40 of the transistor 36, which is directly connected to the base 52 of the power output transistor 54. This transistor would usually be a power transistor in order to provide sufficient energy to the deflection coil for complete deflection of the kinescope electron beam. The output stage is operated in the common emitter mode to provide maximum power gain. The base input signal is therefore amplified and a sawtooth current 74 is caused to flow in the vertical deflection winding 50. This sawtooth current also flows through the sampling resistor 48 as heretofore described and a voltage 76, which is a replica of the deflection coil current 74, is developed across it.

Figure 2:
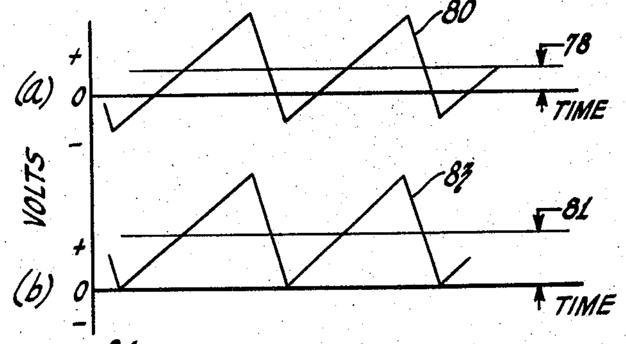
Figure 2 is a graphical representation of certain voltage waveforms obtained for a circuit of the type shown in Figure 1; and, Figure 3 is a schematic diagram of a transistorized vertical deflection circuit including a deflection signal generator circuit, driver amplifier and automatic linearity control amplifier circuit, and vertical deflection output circuit, embodying the invention.

Referring now to Figure 2 the characteristics of the voltage 76 appearing across the sampling resistor is illustrated in detail in order to provide for a more complete understanding of the invention.

It has been heretofore noted that a small residual direct current may flow through the deflection winding 50, if the inductor 66 does not effectively shunt out all the D.C. collector current. This results in a residual voltage drop across the resistor 48, illustrated as the voltage level 78, in Figure 2(*a*). Accordingly, the deflection voltage waveform 76 appearing across this resistor is neither unidirectional nor symmetrical about its zero axis, but will partially extend below the zero voltage axis and into the negative voltage region. The portion of the sawtooth voltage waveform below the zero voltage axis of the sawtooth deflection voltage 80 is shown in Figure 2(*a*).

As has been noted heretofore, the voltage 32 applied to the base 34 of the transistor 36 is unidirectional. It is therefore a requirement that a unidirectional sampled voltage be applied to the emitter 38 in order that waveform comparison and, in addition, automatic linearity control occur in the transistor 36. This requirement may be further appreciated if it is understood that the voltage appearing between the base 34 and the emitter 38 actually provides the driving signal for the transistor 36. The driving signal voltage then equals the base signal voltage minus the emitter signal voltage. The circuit is operative to amplify this difference signal and is, therefore, said to provide differential amplification. If it is assumed that the base signal is always positive in polarity, and at some instant the emitter signal is of negative polarity, then at this instant the difference voltage will be additive rather than subtractive, and as such will operate in the amplifier to further increase deviations between the two signals. Therefore, the difference signal will provide waveform comparison and linearity control only if the base and emitter signals are the same polarity throughout the deflection cycle.

To achieve this, the resistors 44 and 46 along with the sampling resistor 48 form a voltage divider, and are adjusted in value such that the D.C. level of voltage appearing at the emitter 38 causes the sampled waveform to have the D.C. level 81 shown in Figure 2(*b*), with the result that the voltage 83 is unidirectional. The series resistors 46 and 48 form one leg of a voltage divider and the resistor 44 forms the other leg of the voltage divider. Therefore, in accordance with this feature of the invention, the transistor 36 will differentially amplify the base input voltage and the voltage sampled by the resistor 48, and will act to minimize any differences between them.

Figure 3:
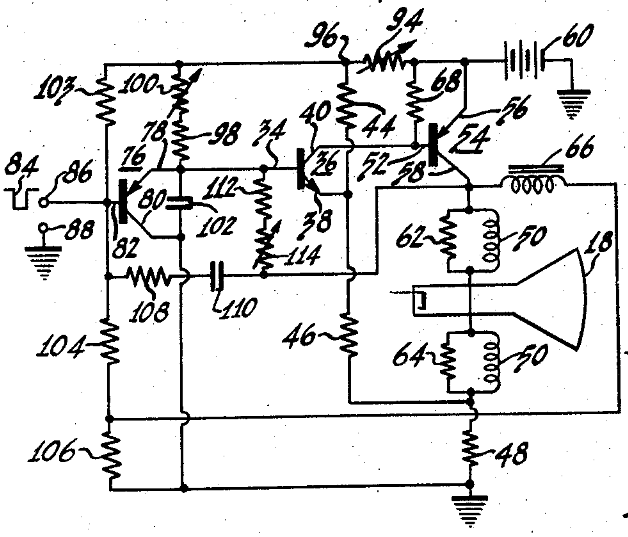

In Figure 3, reference to which is now made, a complete transistorized vertical deflection circuit is shown which includes a transistor sawtooth voltage generator 76, the transistor 36 which serves as a combined driver and automatic linearity control, and the vertical output transistor 54. The transistors 36 and 54 and the connections therefor are similar to their counterparts in Figure 1. The sawtooth voltage generator transistor 76, which may be considered to be of the PNP junction type includes an emitter 78, a collector 80 and a base 82. Negative synchronizing pulses 84, which may be derived from the sync separator circuit of the television receiver, are applied to the terminals 86 and 88 which are connected between the base 82 of the transistor 76 and ground. A variable resistor 94 has one terminal connected to the positive terminal of the battery 60, thereby providing at its other terminal 96 a source of variable D.C. voltage for supplying operating potential to the transistors 76 and 36. This resistor acts to control the amplitude of the driving signal to the transistor 54 and, therefore, functions as a height control.

A resistor 98 and a variable resistor 100 are connected in series between the terminal 96 and the emitter 78 of the transistor 76. The resistors 98 and 100 are also in series with a sawtooth forming capacitor 102 connected between the emitter 78 and the collector 80 of the transistor 76. The collector 80 of the transistor 76 is connected directly to ground. By adjusting the value of the resistor 100, the time constant of the RC charging network including the sawtooth capacitor 102 is varied and thus the slope of the linear deflecting portion of the sawtooth waveform developed at the emitter 78 of the transistor 76, can be varied. This is equivalent to altering the frequency of the vertical sawtooth signal. Therefore, the resistor 100 functions as a vertical "hold" control.

To provide bias voltage for the base 82 of the transistor 76, a resistor 103 is connected between the terminal 96 and the base 82, and two serially connected resistors 104 and 106 are connected between the base 82 and ground. Therefore, both the emitter 78 and the base 82 of the transistor 76 are provided with positive bias voltages of magnitudes such that the transistor is initially cut-off. The emitter 78 of the transistor 76 is directly connected to the base 34 of the transistor 36 for providing sawtooth driving signals thereto.

The circuit of Figure 3 is made regenerative by feeding back a portion of the output voltage from the deflection yoke 50 to the base 82 of the sawtooth generating transistor 76. The feedback network consists of the series connected resistor 108 and capacitor 110. To provide additional linearity correction, a pair of resistors 112 and 114 are connected in series between the base 34 of the transistor 36 and the collector 58 of the output transistor 54. The resistor 114 is made variable in order to provide for manual control of linearity.

To complete the description of that portion of this circuit which differs from the circuit of Figure 1, the centering reactor 66 has one terminal connected to the collector 58 of the output transistor 54 and the other terminal is connected between the junction of the base resistors 104 and 106 for the transistor 76. This connection provides a D.C. feedback path and alters the base voltage of the transistor 76 in accordance with changes in the D.C. collector current of the transistor 54. Compensation is thereby provided for changes of frequency with temperature, as will be discussed hereinafter. In addition, the voltage divider resistor 44 is connected between the terminal 96 and the emitter 38 of the transistor 36. In all other respects the cricuit configuration of Figure 3 is identical to that discussed for Figure 1.

In operation, the transistor 76 will normally be nonconductive. In this condition, the potential of the emitter 78 is at some negative value relative to the potential at the base 82. The emitter 78 is thereby reverse-biased to hold the transistor 76 in a non-conducting condition. Capacitor 102, connected between the collector 80 and the emitter 78, therefore charges due to current flow from the battery 60 through the resistors 94, 98 and 100. Eventually, the transistor 76 will begin to conduct as the voltage on the emitter becomes more positive than the base voltage, and will then provide a low impedance discharge path for the capacitor 102. It is, therefore, apparent that the transistor 76 acts as a switch which periodically discharges the voltage appearing across the capacitor 102. The sawtooth voltage thereby generated is unidirectional.

This type of circuit configuration for the sawtooth generating stage having a grounded collector is a stable one because it provides for the full magnitude of the sawtooth deflection voltage to be developed at the emitter of the transistor. Therefore, small changes of bias voltage at the base 82 of the transistor 76, which are in the order of a few tenths of a volt and are caused by temperature variations, may cause only a slight change in the oscillator frequency. The voltage divider comprised of the resistor 103 and the series connected resistors 104 and 106 set the base bias voltage of the transistor 76 at a positive value equal to the magnitude of sawtooth input required to the base of transistor 36 for full deflecion. This sawtooth voltage driving signal is direct current conductively connected to the base electrode 34 of the transistor 36. The driver transistor 36 functions as a voltage comparison circuit and a driver circuit and amplifies the input sawtooth current and drives the output transistor 54 with a sawtooth current. The transistor amplifier stages 36 and 54 function in the same manner as discussed for the circuit shown in Figure 1.

As noted heretofore, the reactor 66 provides a D.C. feedback path between the collector 58 of the output transistor 54 and the base 82 of the sawtooth wave generating transistor 76. This feedback tends to maintain the frequency of the generated sawtooth wave constant with respect to temperature changes. Such changes may be of the type to either increase or decrease the transistor temperature. Heating of a transistor, which might be caused by increased ambient temperature or by internal power dissipation for example, causes collector and emitter currents to increase in an uncompensated circuit. This is due to the temperature dependent nature of saturation currents in transistors. Accordingly, if it is assumed that the ambient temperature rises, the emitter saturation current in the transistor 76 will also increase, thereby reducing the base-to-emitter voltage and therefore tending to increase the frequency of the sawtooth wave. However, the temperature rise also causes the collector current of the output transistor 54 to increase, thereby feeding back a more positive voltage to the base 82 of the sawtooth wave generating transistor 76. This voltage then reduces the forward base-to-emitter voltage of the transistor 76 and tends to reduce the frequency of the sawtooth generator waveform. Therefore, the frequency of the sawtooth waveform is made stable with respect to temperature variations by this means.

Although an automatic linearity control system is provided, additional manual linearity correction may be used if desired to correct for any non-linearity of the generated sawtooth voltage which might be encountered. The manual linearity control comprising the combination of the capacitor 102 and the series connected resistors 112 and 114 provide for integration of the output sawtooth waveform supplied to the base 34 of the driver transistor 36, thereby providing the sawtooth driving signal with a somewhat parabolic waveform. This correction makes it permissible to use a somewhat smaller value of sawtooth forming capacitor 102 than might otherwise be used and still obtain the same linearity as with a larger capacitor.

It should be noted that in the circuit shown in Figure 3 only two capacitors are used, one being the relatively small capacitor 110 in the feedback path, and the other being the relatively large timing, parabolizing, and sawtooth wave forming capacitor 102. In addition, the elimination of interstage coupling capacitors makes this circuit economical.

While it will be understood that the circuit specifications may vary according to the design for any particular application, the following circuit specifications are including for the circuit of Figure 3, by way of example only:

| | |
|---|---|
| Inductor 66 | 3 ohms, 120 millihenries. |
| Deflection winding 50 | 26 ohms, 26 millihenries. |
| Resistors 44, 46, 48, 62, 64, 68, 94, 98, 100, 103, 104, 106, 108, 112, and 114 | 330, 33, 3, 390, 390, 150, 2500, 6800, 2500, 1200, 470, 1, 1000, 12,000, and 50,000 ohms respectively. |
| Capacitors 110 and 102 | 0.33 and 5 microfarads respectively. |
| Transistor 76 | RCA type 2N109. |
| Transistor 36 | RCA developmental type TA-1683. |
| Transistor 54 | RCA type 2N301A. |
| Battery 60 | 12 volts. |

Automatic linearity control is incorporated in a transistor driver amplifier for a transistor deflection circuit in accordance with the invention. Automatic linearity control is achieved by comparing the driving sawtooth voltage waveform with a voltage which is a replica of the sawtooth current in the deflection coils, and minimizing any differences between the two. This is achieved by applying these voltages to an amplifier connected to provide differential amplification and in addition maintaining them both at one polarity throughout the deflection cycle. Thus, both automatic linearity control and driving current for the deflection output stage are effectively provided by a single transistor amplifier stage.

What is claimed is:

1. In a deflection circuit for a television receiver, the combination comprising, a deflection coil, an output amplifier in series with the deflection coil for applying deflection current thereto, sampling means connected to said deflection coil for obtaining a sampled voltage proportional to said deflection current, a driver amplifier directly connected to said output amplifier for applying an input current thereto, means providing a deflection voltage for said driver amplifier, means for applying said sampled voltage to said driver amplifier, and means for maintaining the sampled voltage and the deflection voltage always at the same polarity including a source of variable direct current voltage connected between said sampling means and said driver amplifier.

2. In a deflection circuit for a television receiver, the combination comprising a deflection coil, an output amplifier in series with the deflection coil for applying a deflection current thereto, sampling means connected to said deflection coil for obtaining a sampled voltage proportional to said deflection current, means for applying a driving signal to said output amplifier including a waveform comparison amplifier connected with said output amplifier, means for applying a deflection voltage to said waveform comparison amplifier, means for applying said sampled voltage to said waveform comparison amplifier, and means for adjusting the direct current level of said sampled voltage to a value such that it is always of the same polarity as said deflection voltage.

3. In a television receiver having a kinescope the combination with a deflection winding including a pair of terminals, of an output transistor amplifier including base, emitter, and collector electrodes; means connecting one terminal of said deflection winding to the collector electrode of said output transistor amplifier; sampling means including a resistor connected to the other terminal of said deflection winding; a driver transistor amplifier for said output transistor amplifier, said driver transistor including base, emitter, and collector electrodes; means directly connecting the collector electrode of said driver transistor to the base electrode of said output transistor; means connecting said sampling means to the emitter electrode of said driver transistor; and means providing an adjustable D.C. voltage across said sampling means including a source of variable direct voltage connected in series with said sampling means.

4. In a vertical deflection circuit for a television kinescope having a deflection winding including a system for maintaining a desired waveform, the combination comprising, a first and second transistor, each of said transistors having emitter, base and collector electrodes, means directly connecting the collector of said first transistor to the base of said second transistor, means directly connecting the collector electrode of said second transistor to said deflection winding for supplying an amplified vertical deflection signal thereto in response to the application of a deflection wave to the base of said first transistor, a choke coil connected with said second transistor in shunt with said deflection winding to prevent substantial direct-current flow through said deflection winding, means for obtaining a signal voltage which is a replica of the current flowing through said deflection winding including a resistor connected in series with said deflection winding, means directly applying said signal voltage to the emitter electrode of said first transistor, and means for adjusting the polarity of said signal voltage including a source of variable direct-current voltage connected to said emitter.

5. In a vertical deflection system for television kinescopes having a vertical deflection winding including a first and second terminal, the combination comprising, a first and second transistor of opposite conductivity types, each of said transistors having emitter, collector and base electrodes, means direct-current conductively connecting the collector electrode of said first transistor to the base electrode of said second transistor, a choke coil connected in shunt with said vertical deflection winding for substantially reducing the direct-current flow in said winding, means connecting the collector electrode of said second transistor to the first terminal of said vertical deflection winding, a first resistor connected between said second terminal of said deflection winding and a point of reference potential, means direct-current conductively connecting said second terminal of said deflection winding to the emitter electrode of said first transistor, means providing a source of energizing potential for said transistors, and means for controlling the direct-current voltage at the emitter electrode of said first transistor including a second resistor connected between said emitter and said source of energizing potential.

6. In a deflection circuit for television receivers, a system for automatically controlling the linearity of the current through a deflection winding, comprising in combination; a transistor sawtooth voltage generator stage including a first transistor of one conductivity type, a driver amplifier and automatic linearity control stage including a second transistor of an opposite conductivity type, and a transistor output amplifier stage including a third transistor of said one conductivity type; each of said transistors having input, output and common electrodes; means providing a direct-current connection between the output electrode of said first transistor and the input electrode of said second transistor; means providing a direct-current connection between the output electrode of said second transistor and the input electrode of said third transistor; means connecting the output electrode of said third transistor to said deflection winding for supplying a deflection current thereto; and means providing self-oscillation including a feedback path connected between the output electrode of said third transistor and the input electrode of said first transistor.

7. In a television receiver the combination with a kinescope having a deflection winding, of a transistor sawtooth voltage generator stage including a first transistor of one conductivity type, a driver amplifier and automatic linearity control stage including a second transistor of an opposite conductivity type, and a transistor output amplifier stage including a third transistor of said one conductivity type; each of said transistors having base, collector and emitter electrodes; means providing a direct-current connection between the emitter electrode of said first transistor and the base electrode of said second transistor; means providing a direct-current connection between the collector electrode of said second transistor and the base electrode of said third transistor; said deflection winding being directly connected to the collector electrode of said third transistor for supplying a deflection current to said winding, and means providing self-oscillation including a feedback path connected between the collector electrode of said third transistor and the base electrode of said first transistor.

8. In a deflection circuit for television receivers, a system for automatically controlling the linearity of the current through a deflection winding, comprising in combination; a transistor sawtooth voltage generator stage including a first transistor of one conductivity type, a driver amplifier and automatic linearity control stage including a second transistor of an opposite conductivity type, and a transistor output amplifier stage including a third transistor of said one conductivity type; each of said transistors having input, output and common electrodes; means providing a direct-current connection between the output electrode of said first transistor and the input electrode of said second transistor; means providing a direct-current connection between the output electrode of said second transistor and the input electrode of said third transistor; means connecting the output electrode of said third transistor to said deflection winding for supplying a deflection current thereto; sampling means including an impedance connected in series with said deflection winding for obtaining a voltage proportioal to said deflection current; means connecting said sampling means to the common electrode of said driver transistor; means providing an adjustable direct-current voltage across said sampling means including a source of variable direct voltage connected in series with said sampling means; and means providing self-oscillation including a feedback path connected between the output electrode of said third transistor and the input electrode of said first transistor.

9. In a vertical deflection circuit for television kinescopes including a system for automatically controlling the linearity of the current through a deflection winding, the combination comprising; a transistor sawtooth voltage generator stage including a first transistor of one conductivity type, a driver amplifier and automatic linearity control stage including a second transistor of an opposite conductivity type, and a transistor output amplifier stage including a third transistor of said one conductivity type; each of said transistors having base, emitter, and collector electrodes; means providing a source of operating potential for said transistors; means providing a direct-current connection between the output electrode of said first transistor and the input electrode of said second transistor; means providing a direct-current connection between the output electrode of said second transistor and the input electrode of said third transistor; means connecting the output electrode of said third transistor to said deflection winding for supplying a deflection current thereto, means providing a voltage proportional to said deflection current including a resistor connected in series with said deflection winding; means directly applying said voltage to the emitter electrode of said second transistor; means for controlling the direct-current voltage at the emitter electrode of said second transistor including a resistor connected between said emitter and said source of operating potential; and means providing self-oscillation including a feedback path connected between the output electrode of said third transistor and the input electrode of said first transistor.

References Cited in the file of this patent

UNITED STATES PATENTS

| | | |
|---|---|---|
| 2,744,198 | Raisbeck | May 1, 1956 |
| 2,797,327 | Kidd | June 25, 1957 |
| 2,821,657 | Newhouse | Jan. 28, 1958 |